US008787886B2

(12) United States Patent
Jonsson

(10) Patent No.: US 8,787,886 B2
(45) Date of Patent: Jul. 22, 2014

(54) VISITOR DETECTOR

(75) Inventor: Hakan Jonsson, Hjarup (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/275,776

(22) Filed: Oct. 18, 2011

(65) Prior Publication Data

US 2013/0095800 A1  Apr. 18, 2013

(51) Int. Cl.
  *H04M 3/42* (2006.01)
(52) U.S. Cl.
  USPC ........... 455/414.1; 455/414.2; 455/411
(58) Field of Classification Search
  USPC ............ 455/41.2, 410, 411, 414.2, 415, 418, 455/419, 420, 423, 424, 425, 432.3, 500, 455/518, 519, 456.1, 456.2, 456.3, 456.4, 455/456.5
  See application file for complete search history.

(56) References Cited

U.S. PATENT DOCUMENTS

| 2005/0174975 A1* | 8/2005 | Mgrdechian et al. | 370/338 |
| 2009/0213796 A1* | 8/2009 | Broshi | 370/328 |
| 2010/0062746 A1* | 3/2010 | Proctor et al. | 455/411 |

* cited by examiner

*Primary Examiner* — Erika A Washington
(74) *Attorney, Agent, or Firm* — Renner, Otto, Boisselle & Sklar, LLP.

(57) ABSTRACT

A method for a user, with a mobile communication device, to receive and display, in the mobile communication device, owner information coupled to a second user, having a second mobile communication device, at said user. The method comprising receiving, in the communication device, a local connectivity ID broadcasted from said second communication device, transmitting said received local connectivity ID from said communication device to an ID server, receiving, in the communication device, an owner ID from said ID server, wherein said owner ID is coupled to said second user, transmitting said received owner ID from said communication device to an public profile service server, receiving, in the communication device, owner information from said public profile service server, wherein said owner information is coupled to said second user and displaying said received owner information coupled to said second user on a display in said communication device.

11 Claims, 4 Drawing Sheets

VISITOR DETECTOR

TECHNICAL FIELD

The invention relates in general to the field of social and context-aware applications involving mobile communication devices, and more particularly, to a method and a system for collecting and displaying personal information relating to people in the immediate surroundings.

BACKGROUND

When working in a large company you meet lots of people every day. Some of them you know well due to the fact that you work with them on a regular basis. However, sometimes it can be quite hard to know if a person whom you not work with on a regular basis is an employee, a consultant working at the company for a limited time, an invited guest visiting for the day, an important business partner or a potential customer. Not knowing the 'social status' of the people you meet in the company could lead to socially awkward situations and in worst case even harm an important business relation or lead to security problems. Thus, finding a way to obtain information about the people you come in contact with, in a non intrusive way, is therefore highly sought after, especially the people you don't spend time with on a regular basis.

SUMMARY OF THE INVENTION

With the above description in mind, then, an aspect of the present invention is to provide a way to obtain information about people in your immediate surroundings, in a non intrusive way, that you usually do not communicate or interact with on a daily basis and thus mitigate, alleviate, or eliminate one or more of the above-identified deficiencies in the art and disadvantages singly or in any combination.

A first aspect of the present invention relates to a method for displaying owner information, in a communication device of a user, coupled to a second user, with a second communication device, being at a distance to said user, the method comprising, receiving, in said communication device of said user, a local connectivity ID broadcasted from said second communication device of said second user, transmitting an owner ID request, comprising at least said received local connectivity ID, from said communication device of said user to an ID server, receiving, in the communication device of said user, an owner ID from said ID server, wherein said owner ID is coupled to said second user of said second communication device, storing and analyzing said received owner ID in said communication device of said user, transmitting an owner information request, with at least said received owner ID, from said communication device of said user to an public profile service server based on said analysis of said owner ID, receiving, in the communication device of said user, owner information from said public profile service server, wherein said owner information is coupled to said second user of said second communication device and displaying said received owner information coupled to said second user on a display in said communication device.

The method may further comprise transmitting, from said communication device of said user, statistical data to a statistical server, processing said statistical data in said statistical server, transmitting said processed statistical data to said communication device of said user and displaying said received processed statistical data together with said owner information in said communication device of said user.

The method wherein said statistical data may be any combination of: local connectivity ID, owner ID, owner information, and positioning information.

The method may further comprise registering said local connectivity ID of said second communication device and owner ID of said second user in said ID server, setting, by said second user, an access level in said ID server, including said user's owner ID in said transmission of said owner ID request from said communication device of said user to said ID server, evaluating, in said ID server said user's owner ID against said access level setting, and transmitting, based on said evaluation, said owner ID or an message to said communication device of said user.

A second aspect of the present invention relates to a system for displaying owner information, in a communication device of a user, coupled to a second user, with a second communication device, being at a distance to said user, the system comprising, a communication device of a user, a second communication device of a second user, an ID server and a statistical server, wherein said system is adapted to perform any of the steps in the method above.

BRIEF DESCRIPTION OF THE DRAWINGS

Further objects, features, and advantages of the present invention will appear from the following detailed description of some embodiments of the invention, wherein some embodiments of the invention will be described in more detail with reference to the accompanying drawings, in which.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Embodiments of the present invention will be exemplified using a mobile communication device such as a mobile phone. However, it should be appreciated that the invention is as such equally applicable to electronic devices in general which have wired- and/or wireless radio communication capabilities. Examples of such devices may for instance be any type of mobile phone, laptops (such as standard, ultra portables, netbooks, micro laptops, and pads), handheld computers, PDAs, gaming devices, accessories to mobile phones, etc. However, for the sake of clarity and simplicity, the embodiments outlined in this specification are exemplified with and related to mobile phones only.

In the description below the word 'coupled' is used to indicate that there is a clear and derivable connection between two items. For example as the connection between a social security number (or personal number) and a person.

Figure 1:
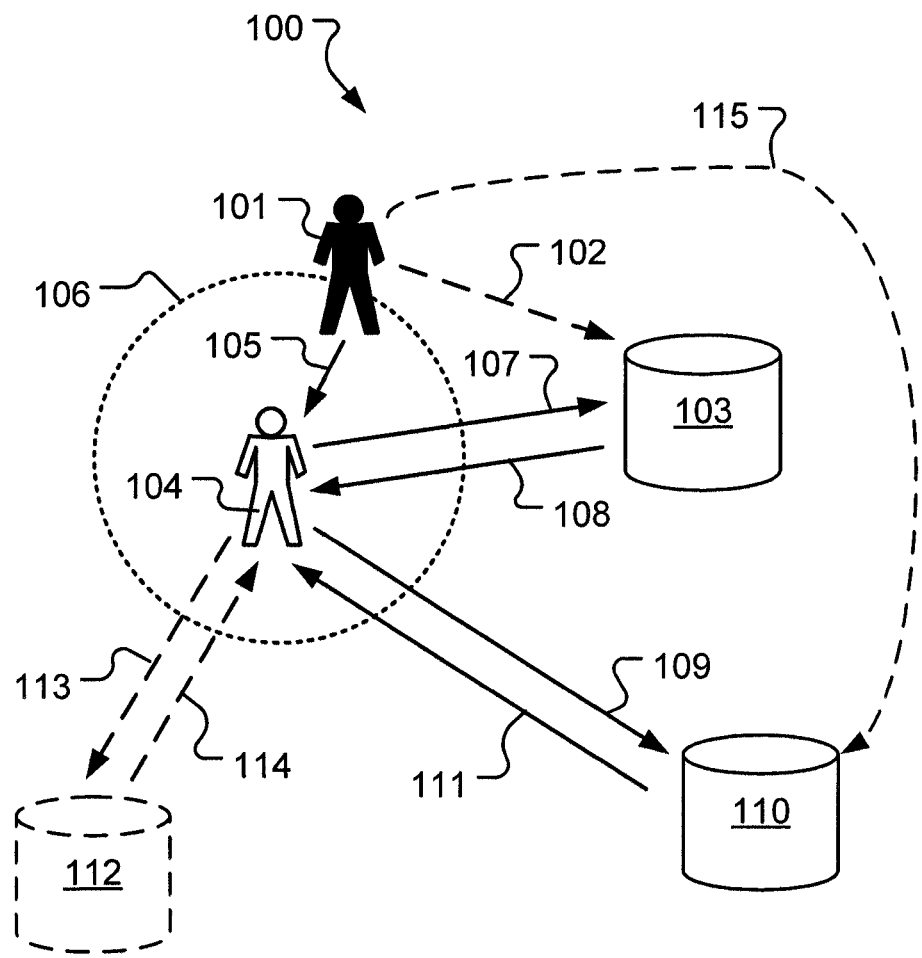
FIG. 1 shows a block diagram of a system for detecting a user in close proximity to another user, according to an embodiment of the present invention.

The present invention provides a way for a user with a mobile phone to obtain, in a non intrusive way, information about people in his or hers immediate surroundings. FIG. 1 illustrates a system 100 according to an embodiment of the present invention where a user 104, having a mobile phone (not shown), wants to obtain information about other users that comes in to close proximity 106 (such as the second user 101 in the figure). The second user 101 has a mobile phone (not shown), which hereinafter is referred to as the second mobile phone, which continuously or with certain intervals broadcasts a local connectivity identity (hereinafter referred to as connectivity ID) to its immediate surroundings.

The used broadcasting technology may be any type of wireless communication technology such as for instance (but not limited to) Bluetooth technology, near field communication (NFC) technology, WiFi technology or the like. The maximum range 106 of the broadcast is limited by the communication technology used by the mobile phone, and may for example range from less than a meter to over 100 meters.

The local connectivity ID may be a unique identity number that is coupled to the mobile phone. An example of such local connectivity ID in a mobile phone is for instance the Media Access Control address (MAC address) of the Bluetooth device in the mobile phone. To couple the unique local connectivity ID to the identity of the user of the mobile phone the local connectivity ID may be registered to the owner of the mobile phone. In this way the unique local connectivity ID is coupled to the user of the mobile phone in a way that it can be used to verify the identity of the user. The registration of the local connectivity ID to the owner could for instance be done at the purchase of the mobile phone by letting the user verify his or her identity by some other means. It may also be registered online when for instance unlocking the device for Internet communication or when updating its software.

When the second user 101 comes in proximity 106 to (i.e. in broadcast range) to the user 104 (i.e. the first user's mobile phone), the user 104 receives 105, in his or hers mobile phone, the local connectivity ID broadcasted from the second user's 101 mobile phone. The user's 104 mobile phone may have an application running in his or hers mobile phone which actively scans or listening on its surroundings for an incoming broadcast of a local connectivity ID. However, the local connectivity ID does not revile any information about the owner of the mobile phone (in this case the owner 101 of the second mobile phone) since it is just an ID number of some sort. After the reception of a local connectivity ID the user's 104 mobile phone transmits 107 a request for owner identity (hereinafter referred to as owner ID), relating to the received local connectivity ID, from the mobile phone 104 to an identity server 103 (hereinafter referred to as ID server). The transmitted request contains at least the received local connectivity ID. The owner ID typically contain information about the owner of the mobile phone such as any combination of a name, address, social security number, passport number, an e-mail address, a user name or ID information to a public profile service (such as Facebook, LinkedIn, Twitter, Google+, etc.), or any other type of unique information coupled to the owner (i.e. a person) of the mobile phone. In this way the identity of the person owning or in possession of the mobile phone can be established.

The ID server 103 may essentially be a database containing local connectivity IDs of mobile phones together with owner ID coupled to each such local connectivity ID. For example, a user with a mobile phone broadcasting using Bluetooth technology has its local connectivity ID, in this case being the Bluetooth MAC address, registered in the ID server 103 together with his or hers owner ID. The owner ID at the ID server 103 may be changed if another user takes possession over the mobile phone, temporary or permanently.

When the ID server 103 receives 107 the request for owner ID with the local connectivity ID from the user 104, the ID server 103 performs a lookup based on the local connectivity ID in its database, and returns 108 the corresponding owner ID to the user's 104 mobile phone. An application in the user's mobile phone may then receive the owner ID, store it and analyze it. The analysis may for instance include a lookup against the phonebook in the user's mobile phone to see if the owner ID is known from previous encounters. Based on the analysis of the received owner ID (for instance if no previous information relating to the owner ID was found stored in the user's mobile phone) the user's 104 mobile phone may then transmit 109 a request for owner information, including at least the received owner ID, from the user's 104 mobile phone to a public profile service server 110. For example, if the analysis of the received owner ID is found to contain a Facebook ID, the owner ID may be sent 109 in a request for owner information to a public profile service server 110, which in this case may be a Facebook server. The public profile server 110 will perfume a lookup based on the received 109 owner ID in its database. The public profile service server 110 will respond, if information relating to the received 109 owner ID was found, by transmitting 111 information about the owner (hereinafter referred to as owner information) coupled to the owner ID. For example, the public profile server 110, in this case the Facebook server, may then return 111 basic contact information about the second user 101 to the user 104. The user's 104 mobile phone receives 111 the owner information, stores (in for instance the phonebook of the mobile phone) and processes the information and displays it to the user 104 in an application on the display of his or hers mobile phone.

The owner information may contain any type of information about the owner of the owner ID such as name, address, picture, contact information, interests, occupation, titles, credit card information, relationship status or any type of information about the owner. For example, the owner information transmitted from the Facebook server 110 may for instance be name, picture, the name of the company he or she is working in, and e-mail address. In this way the user 104 have obtained information about the second user 101, which has come in to close proximity 106 of the user 104, without even speaking to the second user 101, i.e. in a non intrusive way.

Figure 2:
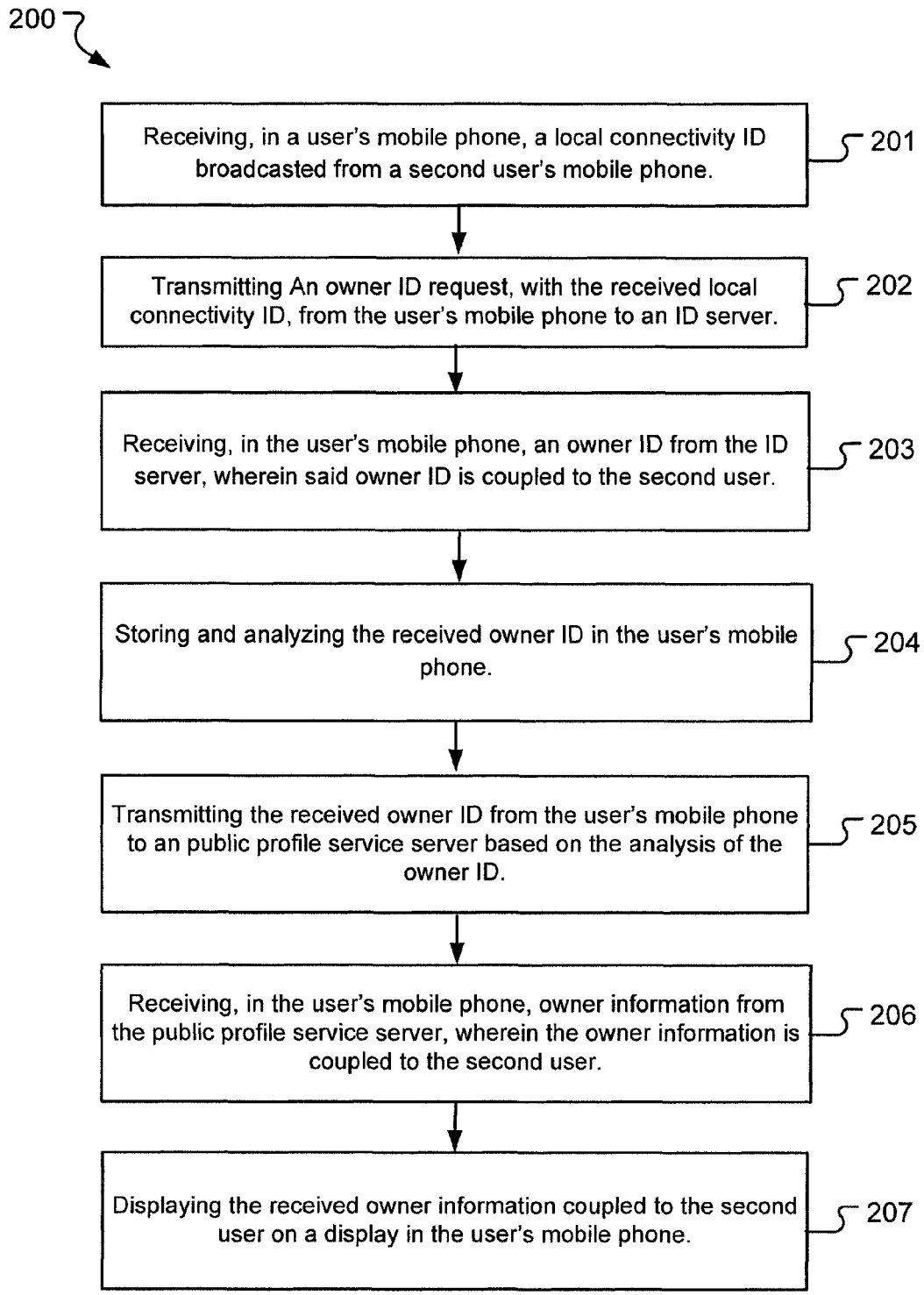
FIG. 2 shows a flowchart describing the steps in obtaining information about a user in close proximity, according to an embodiment of the present invention.

FIG. 2 shows a flowchart 200 describing the main steps of the process of how a user 104 may obtain information about a second user 101, which have come in to close proximity 106 to the user 104, without even having to communicate verbally with the second user 101. The main steps in this process are as follows. The first step 201 relates to receiving, in a user's mobile phone, a local connectivity ID broadcasted from a second user's mobile phone. The second step 202 relates to transmitting the received local connectivity ID from the user's mobile phone to an ID server. The third step 203 relates to receiving, in the user's mobile phone, an owner ID from the ID server, wherein said owner ID is coupled to the second user. The fourth step 204 relates to storing and analyzing the received owner ID in the user's mobile phone. The fifth step 205 relates to transmitting the received owner ID from the user's mobile phone to a public profile service server based on the analysis of the owner ID. The sixths 206 step relates to receiving, in the user's mobile phone, owner information from the public profile service server, wherein the owner information is coupled to the second user. Seventh step 207 relates to displaying the received owner information coupled to the second user on a display in the user's mobile phone.

In a variant of the embodiment described above the second user 101 registers 102 his or hers local connectivity ID together with his or hers owner ID in the ID server 103 before the local connectivity ID is broadcasted or is allowed to be broadcasted 105. The second user 101 may, or in a variant must, also register owner information connected to the owner ID in a public profile server 110. In this way the local connectivity ID can be traced back and coupled to an individual owning the mobile phone and information about that individual.

The ID server 103 may be a local server in a company where the server is only reachable within the premises of the company, or it may be a global server which is reachable from the mobile phone network or the Internet. The public profile server 110 may be a local server in a company where the server is only reachable within the premises of the company or it may be a global server (place somewhere on the planet or in the vicinity thereof) which is reachable from the mobile phone network or the Internet.

In a variant of the embodiment (hence the jagged lines in FIG. 1) of the present invention presented above, data of each discovered user (i.e. received local connectivity ID 105, owner ID 108, owner information 111, and/or geographical position) may be collected and transmitted 113 to a statistical server 112. The data is processed in the statistical server 112 and the processed statistical data may then be transmitted 114 back to the user 104. The received processed statistical data 114 from the statistical server 112 may then be presented in an application and displayed to the user 104 of the mobile phone. In this way complex statistical data of, for instance, how people moves and interact with each other may be compiled 112 in the statistical server 112 and displayed to a user 104.

Figure 3:
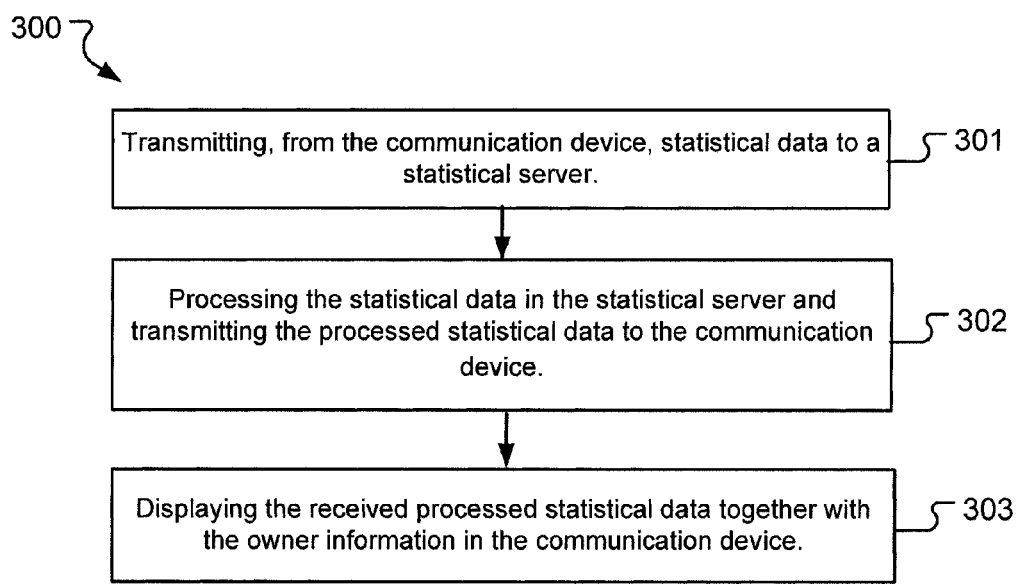
FIG. 3 shows a flowchart describing the process handling statistical data in the system, according to an embodiment of the present invention.

FIG. 3 shows a flowchart 300 describing the process of processing and the displaying of statistical data in the system. The main steps of the process are as follows. The first step 301 relates to transmitting 301, from the communication device, statistical data to a statistical server. The second step 302 relates to processing 302 the statistical data in the statistical server and transmitting the processed statistical data to the communication device. The third step relates to displaying 303 the received processed statistical data together with the owner information in the communication device.

In yet another variant of the present invention, the registration process 102 of the local connectivity ID and the owner ID in the ID server 103 by the second user 101 may also include setting an access level. The ID server 103 may for instance have a security program which makes it possible to grant, restricted grant or refuse access to the owner ID information requested by a user, wherein grant, in one variant, may mean that anyone may have access to your owner ID, restricted grant meaning that a user only gains access to the owner ID if he or she can provide some identification (certificate or ID), and refuse may either mean that no one will gain access or only users identifying them self and are cleared by the owner or the owner ID in advance. In this way the second user 101 may restrict the access to his or hers owner ID. For example, when the user 104 transmits 107 the request for owner ID with the local connectivity ID of the second user 101 to the ID server 103, the user's 104 own owner ID (or for example a certificate or the like) may be attached in the request. The owner ID of the user 104 may then be evaluated against the access level set by the second user 104 in the ID server 103, and based on the settings of the access level the owner ID of the second user 101 may then be transmitted 108 from the ID server 103 to the user 104 or not. If not, a denial message (for example 'access denied') is transmitted 108 to the user 104 instead. Alternatively, an alert message will be sent to the second user 101 giving the second user 101 the option of granting access to his or hers owner ID or refusing it.

Figure 4:
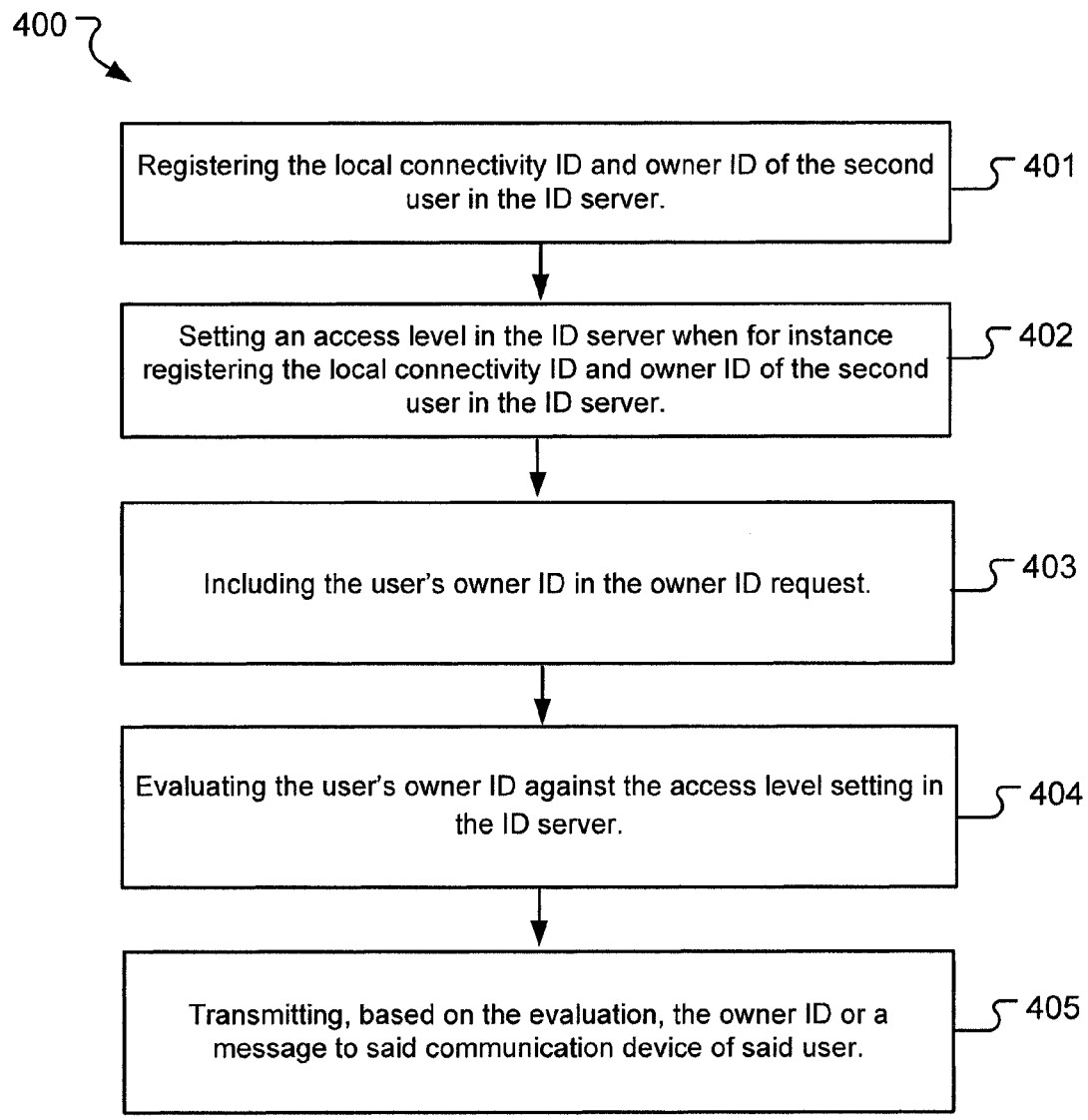
FIG. 4 shows a flowchart describing the process of setting privacy level in the system, according to an embodiment of the present invention.

FIG. 4 shows a flowchart 400 describing the steps of the access process described above. The main steps are as follows. The first step 401 relates to registering 401 the local connectivity ID and owner ID of the second user in the ID server. The second step 402 relates to setting an access level in the ID server when registering the local connectivity ID and owner ID of the second user in the ID server. The third step 403 relates to including the user's owner ID in the owner ID request. The fourth step 404 relates to evaluating the user's owner ID against the access level setting in the ID server. The fifth step 405 relates to transmitting, based on the evaluation, the owner ID or a message to said communication device of said user. The message could for instance be 'access denied'.

In yet another variant the transmission 109 of the request for owner information from the public profile server 110 may be accompanied by a certificate or the owner ID of the user 104. The second user 101 may, in the same manner as with the ID server 103, restrict the level of access to the owner information 115 transmitted 111 back to the user 104. The user may for instance only be allowed basic information such as name and e-mail, while another user may have access to full information such as name, picture address and full contact information. In this way the level of privacy may be determined by the users.

In yet another variant of the present invention the ID server 103 and the public profile server 110 may be the same server or two servers placed in the same geographical area (e.g. at the same company).

In yet another variant of the present invention the ID server 103, the public profile server 110 and the statistical server 112 may be the same server or two (or more) servers placed in the same geographical area (e.g. at the same company). The ID server 103 and the statistical server 112 may also be the same server (or placed in the same geographical area), and the public profile server 110 and the statistical server 112 may also be the same server (or placed in the same geographical area).

In yet another variant of the present invention the proximity range 106 may be change (i.e. the broadcast technology is changed) due to the current context of the user. In a company the proximity range may be set to cover only a few meters while in an urban setting it may be set to cover over 100 meters.

The process of obtaining information about other users coming in close proximity to the user 104 is also applicable to a situation where two or more users comes in close proximity 106 to the user 104 at the same time or over a time frame. However, for clarity and convenience purposes only the situation wherein one second user 104 comes into close proximity has been described above.

To further clarify the present invention and how it may be applied in a real world setting an example is now going to be described.

A visitor (second user 101) arrives at a company. He goes to the reception desk where he registers 102 his local connectivity ID (in this case his Bluetooth MAC address) together with his owner ID (containing a Facebook ID) in the companies ID server 103. The access level is set 102 such that all personnel at the company may request and receive the registered information. The visitor will be at the company for only one day and he will visit several persons in the company and thus will move around in the building in different places. Later that day a worker at the company (a user 104) walks past the visitor. They nod against each other but the worker can't remember who the visitor is or even if he is a visitor or some person working at another department in the company. However, the visitor's mobile phone is broadcasting the visitor's local connectivity ID which is detected 105 by the workers mobile phone. The workers mobile phone sends a request 107 (containing the received local connectivity ID) for the visitor's owner ID to the companies ID server 103. The company ID server 103 receives the request and looks up the owner ID using the local connectivity ID, and transmits 108 back the owner ID to the worker 104. The owner ID is received in the workers mobile phone and is matched against previously stored owner ID's in the workers book of contacts. Unfortunately there is no match in the worker's book of contact but the application in the workers mobile phone detects that the owner ID contains a Facebook ID. The application in the worker's mobile phone then transmits 109 a request (containing the Facebook ID) for owner information to a public profile server 110, which in this case is a Facebook server 110. The Facebook server responds by sending back 111 the requested owner information containing a picture, name, company, company address, title at company, mobile phone number, e-mail address. The worker is alerted by the application in the mobile phone to the fact that new information has been obtained. The worker, now just having past the visitor, retrieves his mobile phone from the back pocket of his trousers and sees the owner information displayed to him on the display of the mobile phone. When he sees the name of the visitor and the company name the visitor is working for the worker instantly remembers where and when he has met the visitor before. Thus, the worker has obtained all necessary information about the visitor passing him in close proximity without intruding upon him. The owner information is stored in the worker's book of contacts in the mobile phone. At the same time information regarding that the worker has met the visitor (in a specific place in the building if location information is obtainable in the mobile phone) is transmitted 113 to the company's statistical server 112 where the data is processed. The application running on the statistical server may for instance be capable of matching the position based on the people the visitor comes in contact with and/or information about the visitors location in the building (if available) to restricted areas for visitors, and thus determine if the visitor is in a restricted area or is moving towards an restricted area. Statistical data may be transmitted back 114 to the worker and displayed on the display of his mobile phone. If the visitor is in a restricted area the worker could be alerted to this fact by the application in his mobile phone.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method for displaying owner information, in a communication device of a user, coupled to a second user, with a second communication device, being at a distance to said user, the method comprising:
    receiving, in said communication device of said user, a local connectivity ID broadcasted from said second communication device of said second user;
    transmitting an owner ID request, comprising at least said received local connectivity ID, from said communication device of said user to an ID server other than said second communication device;
    receiving, in the communication device of said user, an owner ID from said ID server, wherein said owner ID is coupled to said second user of said second communication device;
    storing and analyzing said received owner ID in said communication device of said user the analyzing including looking up said second user in a contact list of said communication device based on the owner ID;
    transmitting an owner information request, with at least said received owner ID, from said communication device of said user to a public profile service server based on said analysis of said owner ID;
    receiving, in the communication device of said user, owner information from said public profile service server, wherein said owner information is coupled to said second user of said second communication device; and
    displaying said received owner information coupled to said second user on a display in said communication device.

2. The method according to claim 1, further comprising:
    transmitting, from said communication device of said user, statistical data to a statistical server;
    processing said statistical data in said statistical server;
    transmitting said processed statistical data to said communication device of said user; and
    displaying said received processed statistical data together with said owner information in said communication device of said user.

3. The method according to claim 2, wherein said statistical data is any combination of: local connectivity ID, owner ID, owner information, and positioning information.

4. The method according to claim 1, further comprising:
    registering said local connectivity ID of said second communication device and owner ID of said second user in said ID server;
    setting, by said second user, an access level in said ID server;
    including said user's owner ID in said transmission of said owner ID request from said communication device of said user to said ID server;
    evaluating, in said ID server said user's owner ID against said access level setting; and transmitting, based on said evaluation, said owner ID or a message to said communication device of said user.

5. A system for displaying owner information, in a communication device of a user, coupled to a second user, with a second communication device, being at a distance to said user, the system comprising:
a communication device of a user;
a second communication device of a second user;
an ID server; and
a statistical server,
wherein said system is adapted to perform any of the steps in claim 1.

6. A system for displaying owner information, in a communication device of a user, coupled to a second user, with a second communication device, being at a distance to said user, the system comprising:
a communication device of a user;
a second communication device of a second user;
an ID server; and
a statistical server,
wherein said system is adapted to perform the following functions:
receiving, in said communication device of said user, a local connectivity ID broadcasted from said second communication device of said second user;
transmitting an owner ID request, comprising at least said received local connectivity ID, from said communication device of said user to an ID server other than said second communication device;
receiving, in the communication device of said user, an owner ID from said ID server, wherein said owner ID is coupled to said second user of said second communication device;
storing and analyzing said received owner ID in said communication device of said user the analyzing including looking up said second user in a contact list of said communication device based on the owner ID;
transmitting an owner information request, with at least said received owner ID, from said communication device of said user to a public profile service server based on said analysis of said owner ID;
receiving, in the communication device of said user, owner information from said public profile service server, wherein said owner information is coupled to said second user of said second communication device; and
displaying said received owner information coupled to said second user on a display in said communication device.

7. The method according to claim 6, wherein said system is adapted to perform the following functions:
transmitting, from said communication device of said user, statistical data to a statistical server;
processing said statistical data in said statistical server;
transmitting said processed statistical data to said communication device of said user; and
displaying said received processed statistical data together with said owner information in said communication device of said user.

8. The method according to claim 7, wherein said statistical data is any combination of: local connectivity ID, owner ID, owner information, and positioning information.

9. The method according to claim 6, wherein said system is adapted to perform the following functions:
registering said local connectivity ID of said second communication device and owner ID of said second user in said ID server;
setting, by said second user, an access level in said ID server;
including said user's owner ID in said transmission of said owner ID request from said communication device of said user to said ID server;
evaluating, in said ID server said user's owner ID against said access level setting; and
transmitting, based on said evaluation, said owner ID or a message to said communication device of said user.

10. The method according to claim 6, wherein said system is adapted to perform the following functions:
transmitting, from said communication device of said user, statistical data to a statistical server;
processing said statistical data in said statistical server;
transmitting said processed statistical data to said communication device of said user;
displaying said received processed statistical data together with said owner information in said communication device of said user;
registering said local connectivity ID of said second communication device and owner ID of said second user in said ID server;
setting, by said second user, an access level in said ID server;
including said user's owner ID in said transmission of said owner ID request from said communication device of said user to said ID server;
evaluating, in said ID server said user's owner ID against said access level setting; and
transmitting, based on said evaluation, said owner ID or a message to said communication device of said user.

11. The method according to claim 10, wherein said statistical data is any combination of: local connectivity ID, owner ID, owner information, and positioning information.

* * * * *